United States Patent
Oleson et al.

(10) Patent No.: US 11,059,589 B2
(45) Date of Patent: Jul. 13, 2021

(54) THREE-PLACE BERTHING AIRCRAFT DIVAN

(71) Applicant: B/E Aerospace, Inc., Winston-Salem, NC (US)

(72) Inventors: Michael L. Oleson, Parkland, FL (US); Hau Phuc Ho, Pembroke Pines, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 466 days.

(21) Appl. No.: 16/054,036

(22) Filed: Aug. 3, 2018

(65) Prior Publication Data

US 2020/0039651 A1 Feb. 6, 2020

(51) Int. Cl.
*B64D 11/06* (2006.01)
*B64D 11/00* (2006.01)

(52) U.S. Cl.
CPC ...... *B64D 11/0641* (2014.12); *B64D 11/0601* (2014.12); *B64D 11/0621* (2014.12); *B64D 11/0633* (2014.12); *B64D 11/0648* (2014.12); *B64D 11/0631* (2014.12); *B64D 2011/0069* (2013.01)

(58) Field of Classification Search
CPC ............ B64D 11/0641; B64D 11/0601; B64D 11/0621; B64D 11/0633; B64D 11/0648; B64D 11/0631; B64D 2011/0069; B64D 11/06205; B64D 11/0629; B64D 11/062
See application file for complete search history.

(56) References Cited

U.S. PATENT DOCUMENTS

| | | | | | |
|---|---|---|---|---|---|
| 2,332,841 | A | * | 10/1943 | Buckwalter | B64D 11/0601 244/118.6 |
| 2,859,803 | A | * | 11/1958 | McCallister | B64D 11/0693 297/245 |
| 4,508,294 | A | * | 4/1985 | Lorch | B64D 25/02 244/122 AG |
| 4,625,934 | A | * | 12/1986 | Ryan | B64D 11/06 244/122 R |
| 8,226,163 | B1 | | 7/2012 | Pearson et al. | |

(Continued)

FOREIGN PATENT DOCUMENTS

| | | |
|---|---|---|
| EP | 3604133 A1 | 2/2020 |
| GB | 2341356 A | 3/2000 |
| WO | 2015/097630 A1 | 7/2015 |

OTHER PUBLICATIONS

International Search Report for Application No. EP19190141.2-1010 dated Dec. 6, 2019.

*Primary Examiner* — Assres H Woldemaryam
(74) *Attorney, Agent, or Firm* — Suiter Swantz pc llo

(57) ABSTRACT

A three-place aircraft divan configured to be installed side-facing in an aircraft and track between an upright sitting position and a berth position. Seat bottom and backrest portions of the divan are movably supported on a static frame and track together. The divan includes inflatable passenger restraints at each seat place and a leg flail prevention device at one end of the frame triggered to actuate in response to an event sensed by a mechanical crash sensor. The inboard leg arrangement of the divan accommodates the installation of two containers for containing high-capacity life rafts under the seat bottom frame, among other equipment.

15 Claims, 10 Drawing Sheets

(56) References Cited

U.S. PATENT DOCUMENTS

| | | | |
|---|---|---|---|
| 8,746,735 B2* | 6/2014 | Meister | B64D 11/06205 |
| | | | 280/733 |
| 8,894,095 B1* | 11/2014 | Meister | B64D 25/00 |
| | | | 280/730.2 |
| 9,315,271 B2 | 4/2016 | Oleson et al. | |
| 2006/0061202 A1* | 3/2006 | Meneses | B64D 11/062 |
| | | | 297/475 |
| 2015/0136904 A1* | 5/2015 | Savard | B60N 2/24 |
| | | | 244/118.6 |
| 2015/0307179 A1* | 10/2015 | Ehlers | B64D 11/0023 |
| | | | 244/118.1 |
| 2016/0001886 A1* | 1/2016 | Fullerton | B60N 2/7005 |
| | | | 297/219.1 |
| 2016/0052636 A1* | 2/2016 | Moeller | B64D 25/02 |
| | | | 244/121 |
| 2016/0325838 A1* | 11/2016 | Erhel | B64D 11/0641 |
| 2017/0015423 A1* | 1/2017 | Udriste | B60N 2/34 |
| 2017/0283079 A1* | 10/2017 | Meadows | B64D 25/06 |
| 2018/0043857 A1* | 2/2018 | Kennair, Jr. | A44B 11/2542 |
| 2018/0290751 A1* | 10/2018 | Emrich | B64D 11/0696 |
| 2018/0312258 A1* | 11/2018 | Itzinger | B60N 2/753 |
| 2019/0127070 A1* | 5/2019 | Oleson | B64D 11/0619 |

\* cited by examiner

THREE-PLACE BERTHING AIRCRAFT DIVAN

BACKGROUND

Divans, sofas and the like are commonly installed in executive and private aircraft to provide lounge seating in various cabin configurations. Like passenger seats in commercial aircraft, divans must be specially constructed to meet strict Federal Aviation Administration (FAA) guidelines. In particular, divans are required to meet dynamic and static testing requirements of the FAA per 14 CFR Parts 25.561 and 25.562 for aircraft seating. In addition, side-facing divans are required to be certified to meet FAA requirements for side-facing divans per FAA Policy PS-ANM-25-03-R1 as it pertains to occupant protection.

Conventional divans, and particularly divans with multiple seat places, have been unable to meet the FAA requirements for divans. As a result, three-place divans have conventionally been provided in separate adjacent sections, with one section having a single seat and the adjacent section having two seats. Such configuration requires the duplication of, for example, actuators, sensor systems and frame members, thereby disadvantageously increasing cost, complexity and weight. In addition, two separate sections require at least four front legs, thereby limiting space available for under-seat storage. Still further, conventional divans have lacked adequate restraints and leg flail protection necessary to comply with FAA requirements for divans.

Accordingly, there is a need for a divan construction able to meet the FAA requirements for side-facing divans while providing at least three seat-places with a single frame construction, as well as a divan configured to transition between an upright sitting position and a berth position.

SUMMARY OF THE INVENTIVE ASPECTS

To achieve the foregoing, the inventive aspects disclosed herein are directed to a three-place berthing aircraft divan including a fixed frame including a seat bottom frame and a backrest frame, three inboard legs affixed to the seat bottom frame, a seat bottom tracking platform supported by the seat bottom frame and movable relative thereto to track the aircraft divan between an upright sitting position and a berth position, a backrest back follower supported by the backrest frame and movable relative thereto, the back follower and the tracking platform linked such that the back follower and the tracking platform track together, a passenger restraint provided at each seat place, and an automatic leg flail prevention device disposed below one end of the seat bottom frame.

In another inventive aspect, the first leg and the third leg are disposed at opposing ends of the seat bottom frame, the second leg is disposed midway between the first leg and the third leg, the first leg and the second leg are spaced apart a predetermined distance such that a first container for containing a high-capacity life raft can be installed under the seat bottom frame between the first leg and the second leg, and the second leg and the third leg are spaced apart a predetermined distance such that a second container for containing a high-capacity life raft can be installed under the seat bottom frame between the second leg and the third leg.

In a further inventive aspect, the seat bottom frame includes lateral frame members at opposing ends thereof each including a first track and a second track along which respective first and second guides carried on the tracking platform are guided as the aircraft divan tracks between the upright sitting position and the berth position, and the backrest frame includes lateral frame members at opposing ends thereof each including a single track along which guides carried on the back follower are guided as the aircraft divan tracks between the upright sitting position and the berth position.

In a further inventive aspect, the tracking platform is aligned atop the seat bottom frame when the aircraft divan is in the upright sitting position and the tracking platform tracks inboard in a direction of an adjacent aisle and overhangs the aisle when the aircraft divan is in the berth position, and the back follower is aligned forward of the backrest frame when the aircraft divan is in the upright sitting position and is positioned atop the seat bottom frame when the aircraft divan is in the berth position.

In a further inventive aspect, the aircraft divan further includes a headrest position atop the backrest frame, cushions affixed to the backrest, and cushions affixed to the seat bottom.

In a further inventive aspect, each passenger restraint includes a lap belt anchored to the tracking platform and an inflatable shoulder harness detachable from the lap belt, wherein one end of the inflatable shoulder harness is wound on a retractor disposed under the seat bottom frame, and wherein a portion of the inflatable shoulder harness is routed outboard of the backrest frame and stows outside of the retractor such that the retractor provides unceasing tension on the inflatable shoulder harness.

In a further inventive aspect, the tracking platform interlocks with the seat bottom frame and the lap belts are affixed to an outboard tube of the tracking platform such that the lap belts track inboard with the tracking platform and loading on the lap belts is transferred to the seat bottom frame through the tracking platform.

In a further inventive aspect, the aircraft divan includes a tracking handle disposed at one end of the seat bottom frame coupled to at least one locking pin preventing relative movement between the tracking platform and the seat bottom frame, the tracking handle actuated to disengage the at least one locking pin to allow the aircraft divan to track from the berth position to the upright sitting position.

In a further inventive aspect, the aircraft divan includes a mechanical crash sensor unit operably connected to the passenger restraints and the automatic leg flail prevention device, the mechanical crash sensor unit including a processor configured to sense a crash event, and in response to the sensed crash event, trigger inflation of a portion of each passenger restraint and deploy the automatic leg flail prevention device.

In another aspect, the inventive concepts disclosed herein are directed to a three-place berthing aircraft divan adapted to be installed side-facing in an aircraft cabin. The divan includes a fixed frame including a seat bottom frame and a backrest frame affixed to the seat bottom frame, a plurality of inboard legs affixed to the seat bottom frame, a seat bottom supported by the seat bottom frame including a tracking platform movable relative to the seat bottom frame to track the aircraft divan between an upright sitting position and a berth position, a backrest supported by the backrest frame including a back follower movable relative to the backrest frame to track the aircraft divan between the upright sitting position and the berth position, a passenger restraint provided at each seat place including a lap belt anchored to the tracking platform and an inflatable should harness detachable from the lap belt, a leg flail prevention device disposed under one end of the seat bottom frame, and a mechanical crash sensor unit including a processor configured to sense a crash event, and in response to the sensed crash event, trigger inflation of each inflatable should harness and deploy the leg flail prevention device. The tracking platform and the back follower are pivotably attached such that the seat bottom and the backrest track together relative to the frame between the upright sitting position and the berth position.

In another inventive aspect, the plurality of inboard legs includes a first leg, a second leg, and a third leg, wherein the first and second legs are adjacent and the second and third legs are adjacent and are spaced apart such that two containers for each containing a high-capacity life can be installed below the seat bottom frame between the plurality of inboard legs.

In a further inventive aspect, the aircraft divan has a length from about 200 cm to 205 cm, and wherein a distance between the first and second legs, and the second and third legs, is about 100 cm.

In a further inventive aspect, the seat bottom frame and the backrest frame each define elongate tracks for guiding tracking of the respective tracking platform and the back follower between the upright sitting position and the berth position, and each of the tracking platform and the back follower carry vertically-oriented rollers that travel along respective ones of the elongate tracks.

In a further inventive aspect, one end of each inflatable shoulder harness is wound on a retractor affixed under the seat bottom frame, wherein a length of the inflatable shoulder harness remains outside of the retractor such that the retractor provides unceasing tension on the inflatable shoulder harness.

In another aspect, the inventive concepts disclosed herein are directed to an aircraft divan including a single frame construction including a seat bottom frame and a backrest frame having a length providing three seat places, a plurality of inboard and outboard legs affixed to the frame for securing the aircraft divan within an aircraft, a seat bottom supported on the seat bottom frame and including a tracking platform movable relative to the seat bottom frame to track the aircraft divan between an upright sitting position and a berth position, a backrest supported on the backrest frame and pivotably attached to the seat bottom, the backrest including a back follower movable relative to the frame to track with the tracking platform, and a passenger restraint provided at each of the three seat places including a lap belt and a shoulder harness detachable from the lap belt.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DESCRIPTION OF ILLUSTRATIVE EMBODIMENTS

Figure 1:
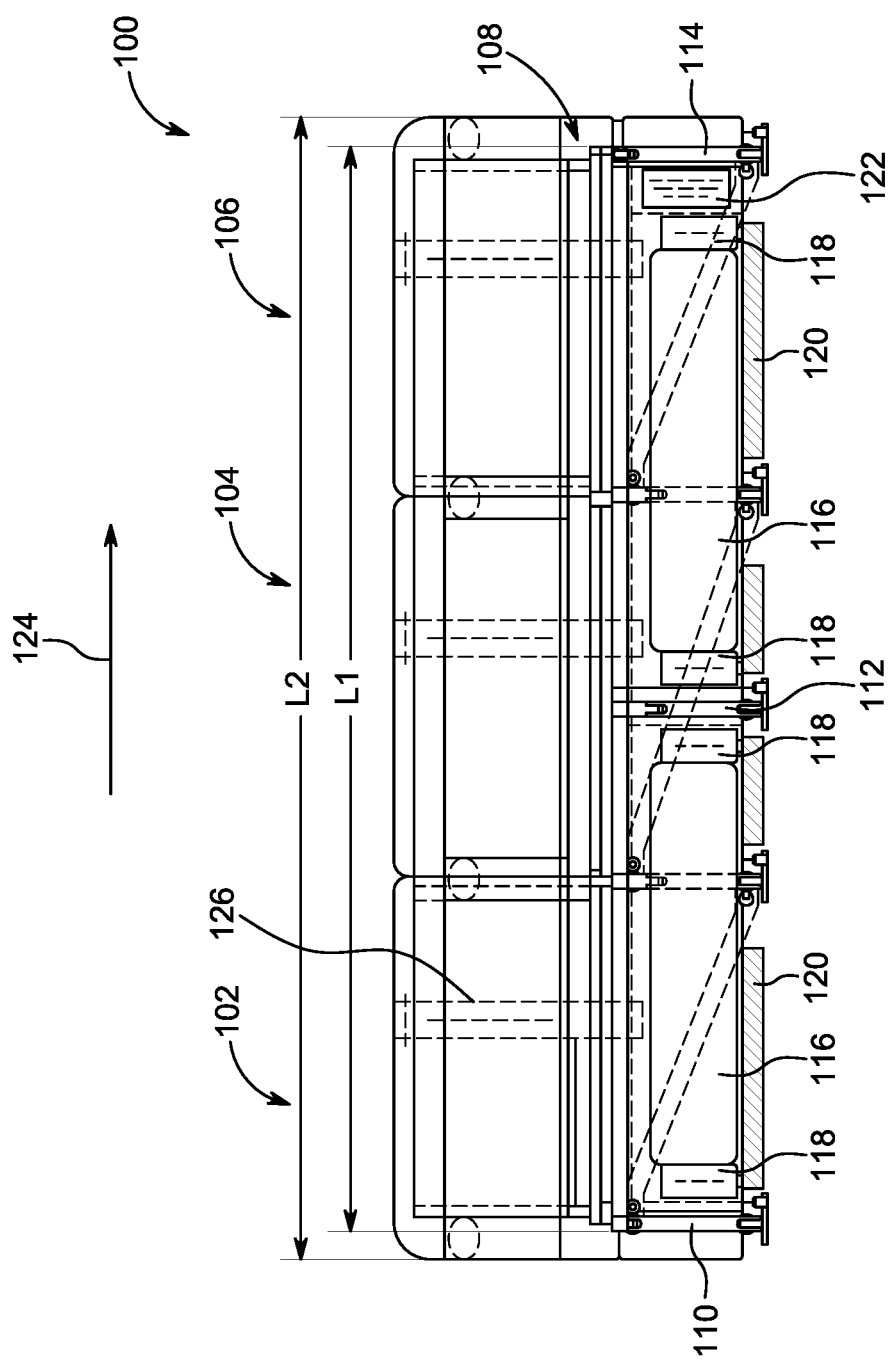
FIG. 1 is a front view of a three-place berthing divan according to an exemplary embodiment.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

The aspects, features and functions described below in connection with one embodiment are intended to be applicable to the other embodiments described below except where expressly stated or where an aspect, feature or function is incompatible with an embodiment. Further, the terms "about" and "substantially" with reference to a numerical value include the recited value within a margin of 20%, more preferably 10%, and even more preferably 5%, and any values therebetween.

Referring to the drawing figures, disclosed herein are inventive aspects of a multi-seat aircraft divan configured to be installed, for example, side-facing within an aircraft cabin. Seat bottom and backrest portions of the divan are linked and movably supported on a static frame such that the seat bottom and backrest track together between and upright sitting position and a berth position. The divan is further equipped with an inflatable passenger restraint at each seat place, and at least one automatic leg flail prevention device. A mechanical crash sensor unit is operable for triggering inflation of the plurality of inflatable restraints and deployment of the at least one leg flail prevention device in response to a sensed event, for example, a sudden deceleration or crash event. The inboard leg arrangement (e.g., adjacent an aircraft aisle) of the divan is such that, for example, boxes for containing high-capacity life rafts can be stowed under the divan frame accessible between the adjacent front legs, as well as other equipment such as passenger life vests and air plenums for distributing conditioned air into the cabin.

FIG. 1 depicts an aircraft divan generally at reference numeral 100. The divan 100 can be installed side-facing in an aircraft, such that the "front" of the divan faces and is adjacent a longitudinal aircraft aisle, and the "back" of the divan is adjacent the aircraft fuselage. The longitudinal aircraft aisle, for example, can extend the length of and longitudinally bisect the aircraft passenger cabin. As used herein, as installed in an aircraft, the term "forward end" with respect to the divan refers to the divan end closest the cockpit, and the term "rear end" with respect to the divan refers to the divan end closest the tail of the aircraft.

The divan 100 has a finished length sufficient to provide three dedicated seat-places, including a first or "left" seat place 102, a second or "middle" seat place 104, and a third or "right" seat place 106, as viewed in FIG. 1 facing into the divan. The divan 100 can therefore seat from one to three passengers, wherein the divan is partially occupied when one or two passengers are seated and is fully occupied when three passengers are seated. Other divan configurations and lengths are envisioned and may benefit from the inventive aspects disclosed herein, including 1, 2, 3 . . . n number of seat places provided on a single divan frame.

In an exemplary aspect, a length L1 of the divan frame 108 may be from about 195 cm to 200 cm (i.e., about 77 inches), and a finished divan length L2 including cushions and upholstery may be from about 200 cm to 205 cm (i.e., about 80 inches). The divan 100 includes three inboard legs 110, 112, 114 for securing the divan within the aircraft, for example, with track fittings. The first leg 110 is affixed adjacent one end of the frame 108, the third leg 114 is affixed adjacent an opposing end of the frame 108, and the second or middle leg 112 is affixed to the frame 108 midway between the first leg 110 and the third leg 114. The outboard side of the divan 100 can be secured within the aircraft by way of a plurality of outboard legs, by way of direct attachment to the aircraft fuselage, or a combination thereof.

The first and second legs 110, 112, and the second and third legs 112, 114, are spaced apart such that containers 116 for containing high-capacity life rafts can be installed under the divan accessible from the adjacent aircraft aisle. As shown, one container 116 is disposed directly below the first seat 102 and a portion of the second seat 104 and is accessible between the first and second legs 110 112, and the other container 116 is disposed directly below the third seat 106 and a portion of the second seat 104 and is accessible between the second and third legs 112, 114. In this arrangement, both containers 116 are unobstructed and easily accessible from the aisle.

Life vest containers 118 can be disposed to one or both sides of each container 116, and plenums 120 for directing conditioned air into the aircraft cabin can be disposed directly below the life-raft containers 116. As discussed in detail below, a leg flail prevention device 122 can be disposed near one end of the divan frame 108 configured to project a lower leg retaining member forward into the adjacent aisle in response to a sensed event. As shown in FIG. 1, the direction of forward travel of the aircraft is indicated at reference numeral 124, consequently the leg flail device 122 is disposed near the end of the divan 100 directly inward of the third leg 114.

Also as shown in FIG. 1, and as discussed in detail below, each seat place 102, 104, 106 is equipped with a passenger restraint generally including a lap belt, an inflatable shoulder harness detachable from the lap belt, a retractor, and a belt guide 126. The belt guides 126 can be routed along a backside of the frame 108 at each seat place and function in one aspect to guide the paying in and out of the inflatable portion of the shoulder harness.

Figure 2:
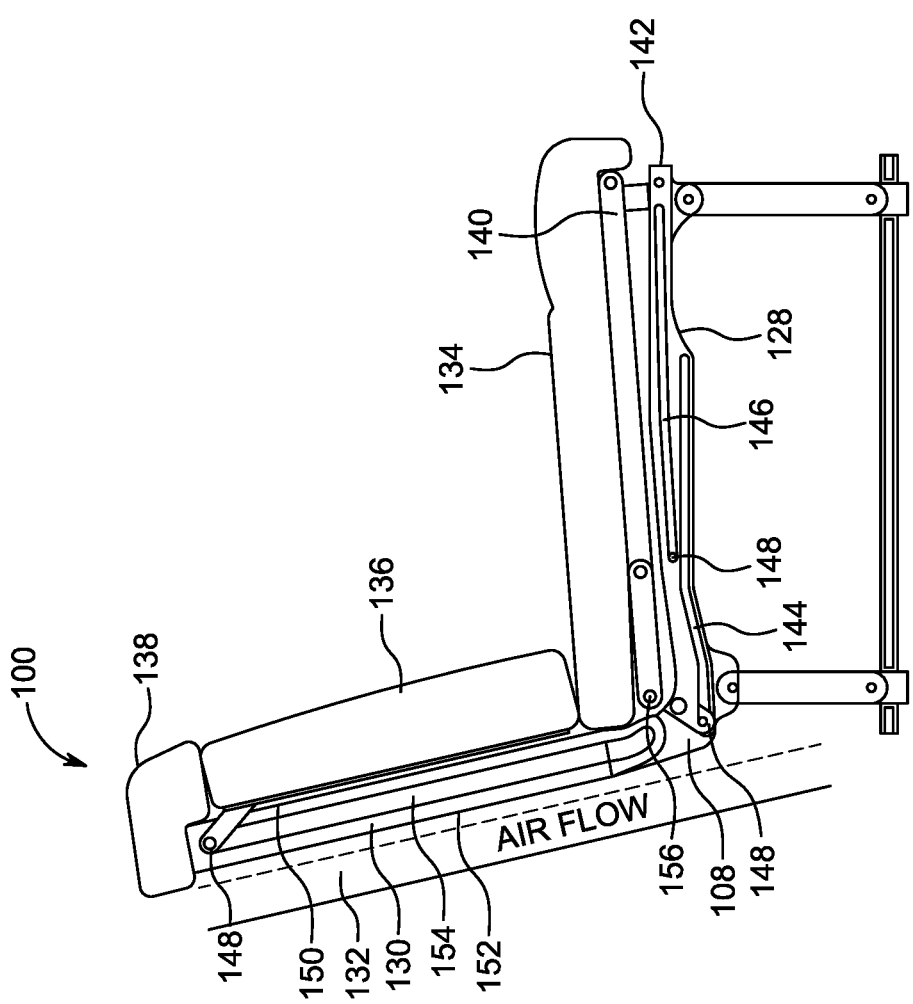
FIG. 2 is a side view of the aircraft divan shown in an upright sitting position.

FIG. 2 depicts an upright sitting position of the divan 100 for taxi, take-off and landing. The divan frame 108 generally includes a seat bottom frame 128 and a backrest frame 130 affixed to the seat bottom frame. One or more air ducts 132 for directing conditioned air to the one or more of the plenums 120 can be routed along the space between the backrest frame 130 and the fuselage.

The divan 100 further includes a seat bottom 134 movably supported on the seat bottom frame 128, a backrest 136 movably supported on the backrest frame 130, and a headrest 138 positioned atop the backrest frame 130. Each of the seat bottom 134, the backrest 136 and the headrest 138 can be cushioned and upholstered. The seat bottom 134 includes a tracking platform 140 movable relative to the divan frame 108 to transition the seat bottom between the upright sitting position and the berth position. The seat bottom frame 128 includes lateral frame members 142 at opposing ends thereof each defining at least one elongate track for guiding tracking motion of the tracking platform 140, and thus the seat bottom 134, between the upright and berth positions.

Each lateral frame member 142 as shown defines a first elongate track 144 and a second elongate track 146 positioned forward and above the first elongate track 144. Both tracks 144, 146 are non-linear and the outboard extent of each track is vertically lower than the inboard extent such that seat bottom orientation is at a shallow angle to horizontal when in the upright sitting position and horizontal when in the berth position. The tracking platform 140 carries first and second guides 148 on the opposing ends thereof that travel along the length of the respective tracks 144, 146 to guide the tracking motion of the tracking platform 140 as the tracking platform transitions between the upright and berth positions. The guides 148 in an exemplary aspect can be vertically oriented rollers carried on brackets, the rollers adapted to roll along the length of the respective tracks to facilitate smooth tracking motion over repeated cycling.

Backrest motion is controlled like seat bottom motion. The backrest 136 includes a back follower 150 movable relative to the divan frame 108, and particularly the backrest frame 130, to transition the backrest 136 between the upright sitting position and the berth position. The backrest frame 130 includes lateral frame members 152 at opposing ends thereof each defining an elongate track 154 for guiding tracking motion of the back follower 150, and thus the backrest 136, between the upright and berth positions of the divan. The elongate tracks 154 are substantially linear and can have a slight curvature inboard at the lower end thereof utilized to achieve and help lock in place the fully berthed position of the backrest 136. The back follower 150 carries a guide 148 on each end thereof that travels along the length of one of the respective tracks 154 to guide the tracking motion of the back follower 150. Each guide 148 of the back follower 150 can be a vertically oriented roller adapted to roll along the length of its respective track 152. In the upright sitting position, the back follower 150 is shown aligned forward of the backrest frame 130, and in the berth position the back follower is shown positioned atop the seat bottom frame 128.

The backrest 136 and the seat bottom 134 are linked such that the two track together, with seat bottom actuation driving movement of the backrest 136 or vice-versa. In an exemplary embodiment, the seat bottom 134 and the backrest 136 are pivotably attached about a backrest pivot axis 156. Seat bottom motion can be actuator or mechanically driven using any number of conventional mechanisms.

Figure 3:
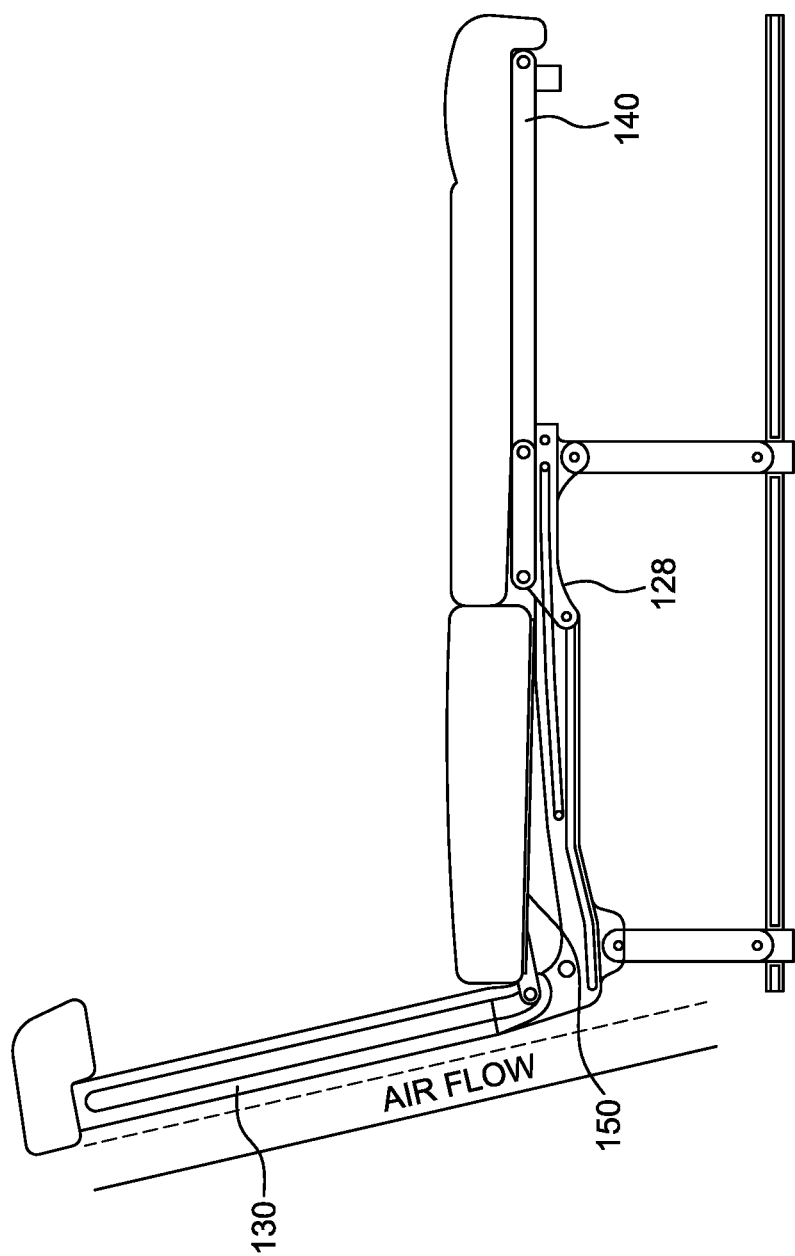
FIG. 3 is a side view of the aircraft divan shown in a berth position.

FIG. 3 depicts the fully berthed position of the divan 100 for sleeping. In the berth position the seat bottom 134 and backrest 136 together form a bed. The cushions remain attached to the seat bottom 134 and backrest 136 as the divan transitions. In the berth position, the back follower 150 is aligned over the seat bottom frame 128 and the tracking platform 140 overhangs the aisle. The headrest 138 can be static or vertically adjustable and remains in place atop the backrest frame 130. The headrest 138 can include a single continuous headrest spanning substantially the length of the divan 100 or can include individual headrests at each seat place. In one aspect, the tracking platform 140 may track horizontally inboard about 35 cm to 40 cm (i.e., about 14 inches). The dual guides 148 at each end of the divan 100 together support the cantilever of the seat bottom 134 when berthed.

Figure 4:
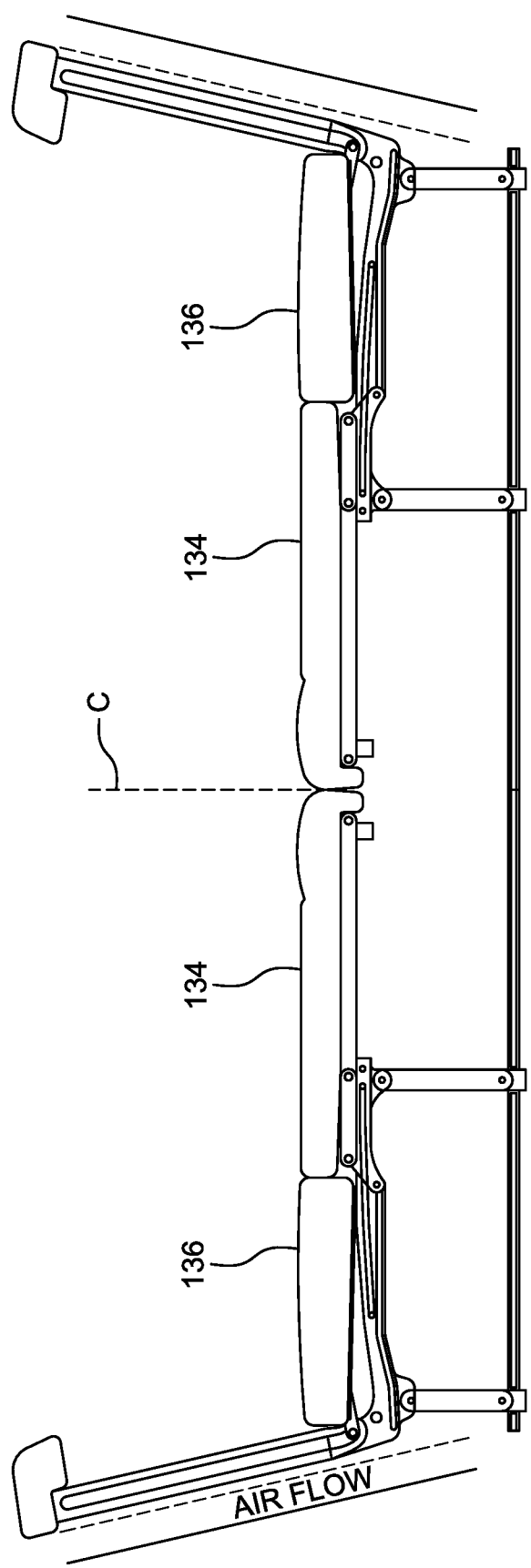
FIG. 4 is a side view of opposing like aircraft divans tracked to berth positions and meeting at an aircraft centerline.

FIG. 4 depicts two like opposing divans 100 each tracked inboard to the fully berthed position to meet at the aircraft centerline C or other predetermined point to provide a continuous bed surface that occupies substantially the full width of the aircraft cabin. For example, bed width measured between the outboard ends of the backrests 136 may be comparable to the width of a standard king-sized bed.

Figure 5:
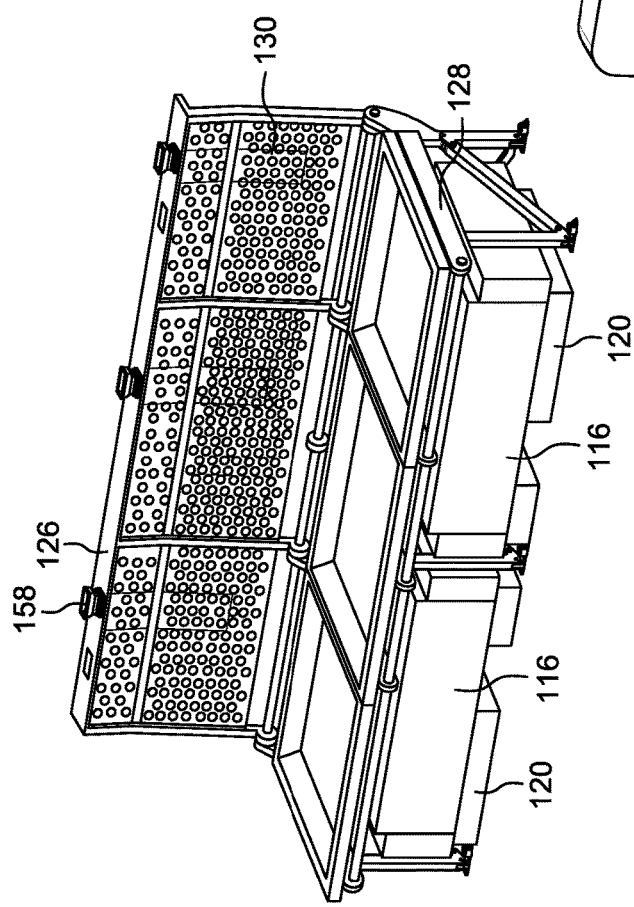
FIG. 5 is a perspective view of an aircraft divan frame showing under-seat storage.
Figure 6:
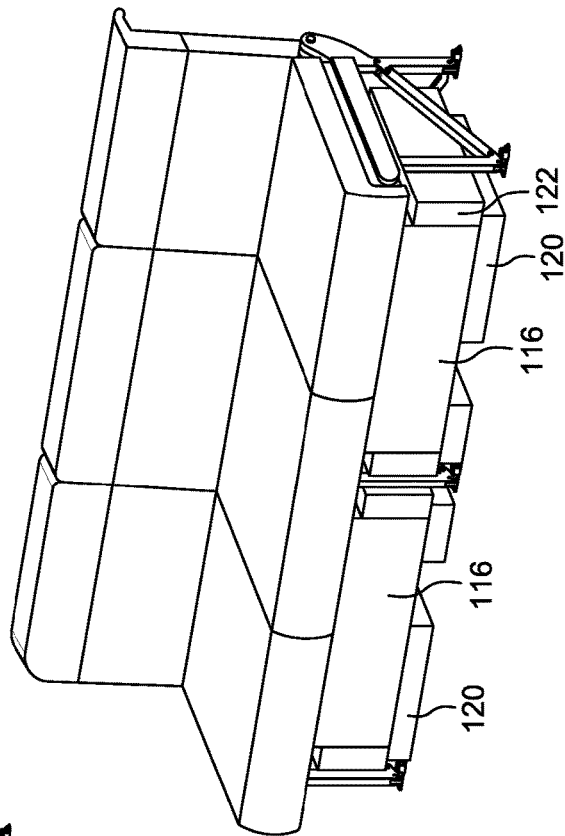
FIG. 6 is a perspective view of a finished aircraft divan showing under-seat storage.

FIG. 5 depicts an exemplary divan single frame construction with three seat places and showing two containers 116 for containing life vests installed below the seat bottom frame 128. A plurality of plenums 120 are installed below the containers 116 and open into the aisle to direct conditioned air into the aircraft cabin. The backrest frame 130 is continuous from one end of the frame to the other. Three individual belt guides 126 are routed along the backside of the backrest frame 130 and can be affixed thereto. Each belt guide 126 can be coupled to an exit bezel 158 affixed atop the backrest frame 130 for guiding the inflatable shoulder harness into and out of the belt guide. FIG. 6 depicts the same divan single frame construction of FIG. 5 shown finished with cushions and upholstery.

Figure 7:
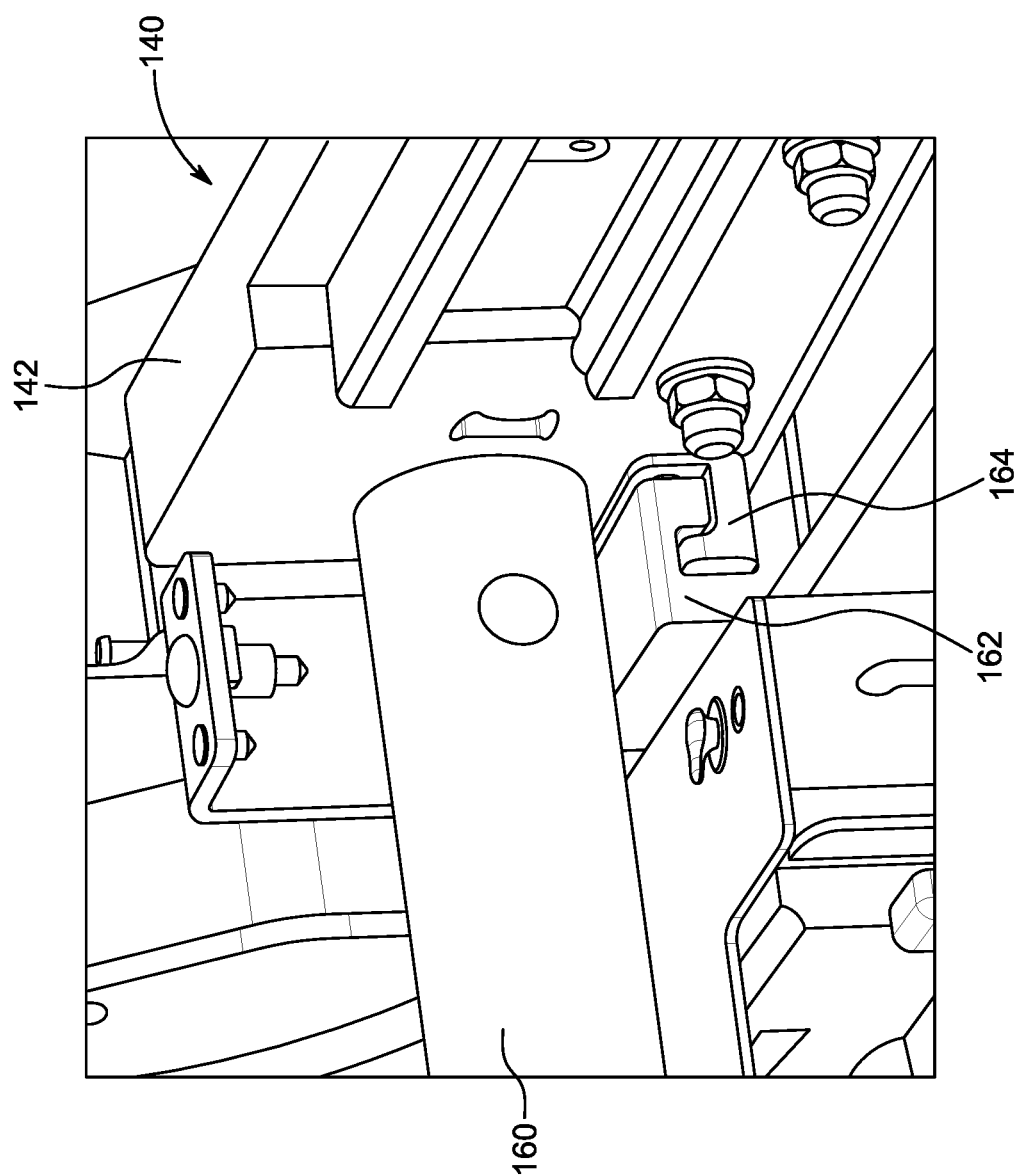
FIG. 7 is a detailed view of an aircraft divan frame showing an outboard locking feature of the tracking platform and divan frame.

FIG. 7 depicts outer interlocking features of the divan frame 108 and tracking platform 140. The tracking platform 140 can include inboard and outboard tubes 160 affixed to the lateral frame members, for example, four lateral frame members thereby providing three seat places. The frame 108 and tracking platform 140 interlock to transfer dynamic loads on the lap belts to the divan frame 108. As shown, a first interlocking feature 162 is affixed to the divan frame 108, and a second interlocking feature 164 is affixed to the inner side of one of the lateral frame members 142. The second interlocking feature 164 engages within the first interlocking feature 162 when the tracking platform is in the upright sitting position as shown such that occupant loads on the tracking platform from the lap belts, which are anchored to the tracking platform, are transferred to the divan frame 108 and ultimately to the track fittings. Like first interlocking features can be affixed to the inboard side of the divan frame, facing the outboard first interlocking features 162, such that the same second interlocking features 164 on tracking platform 140 lock to the divan frame 108 when the tracking platform is in the berth position.

Figure 8:
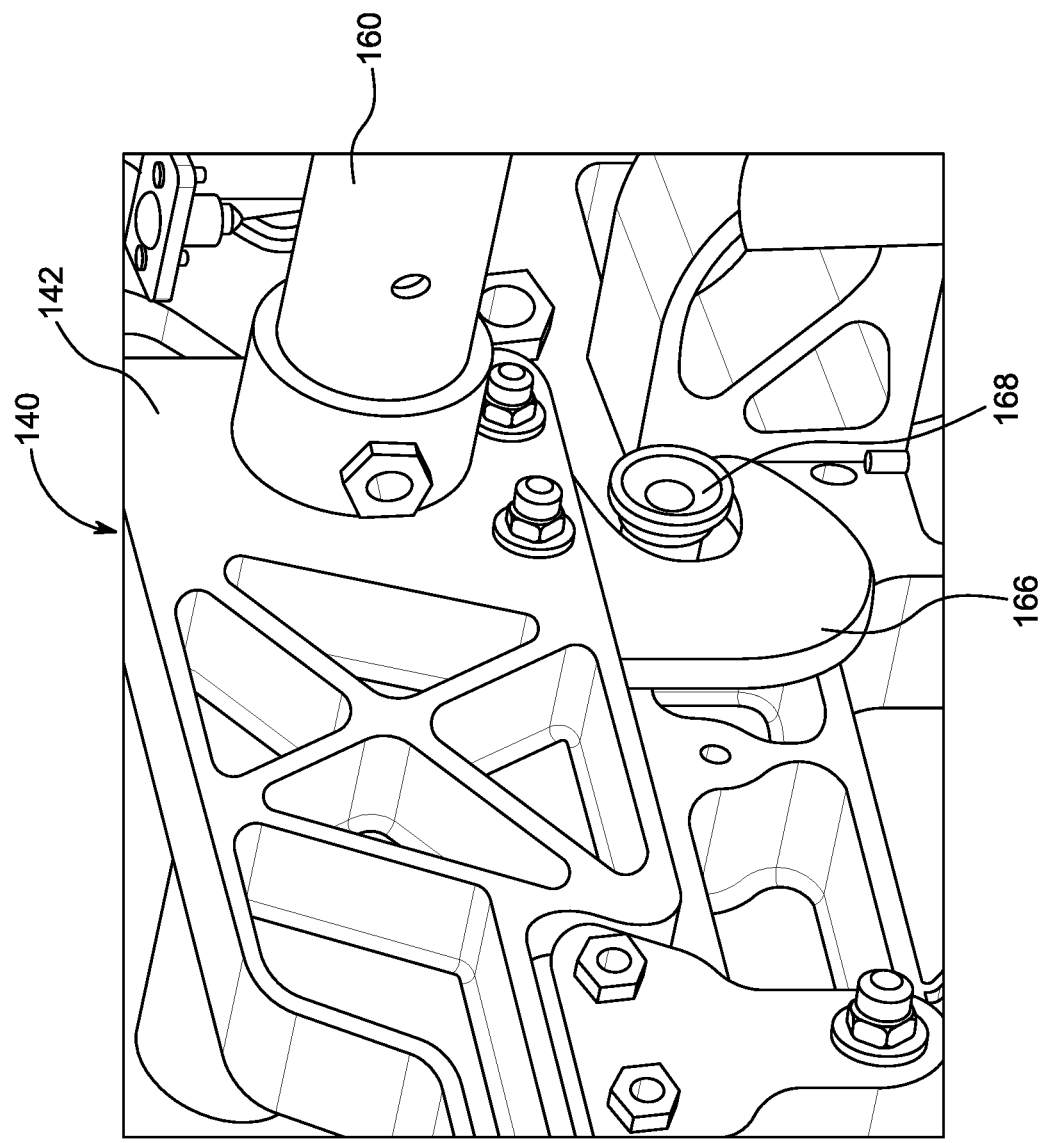
FIG. 8 is a detailed view of an aircraft divan frame showing an intermediate locking feature of the tracking platform and divan frame.

FIG. 8 depicts intermediate hook-lock features of the tracking platform 140. The lap belts are anchored to the tracking platform 140 and therefore track inboard with the tracking platform. For example, the lap belts can be affixed to the outboard tube 160. In an exemplary aspect, a hook 166 affixed to each intermediate lateral frame member engages a post 168 affixed to the divan frame 108. The outer interlocking features as shown in FIG. 7 and the intermediate hook-lock features shown in FIG. 8 together lock the tracking platform 140 to the divan frame 140 in the upright and berth positions such that load paths of the lap belts are transmitted through the divan frame 108 during a dynamic event.

Figure 9:
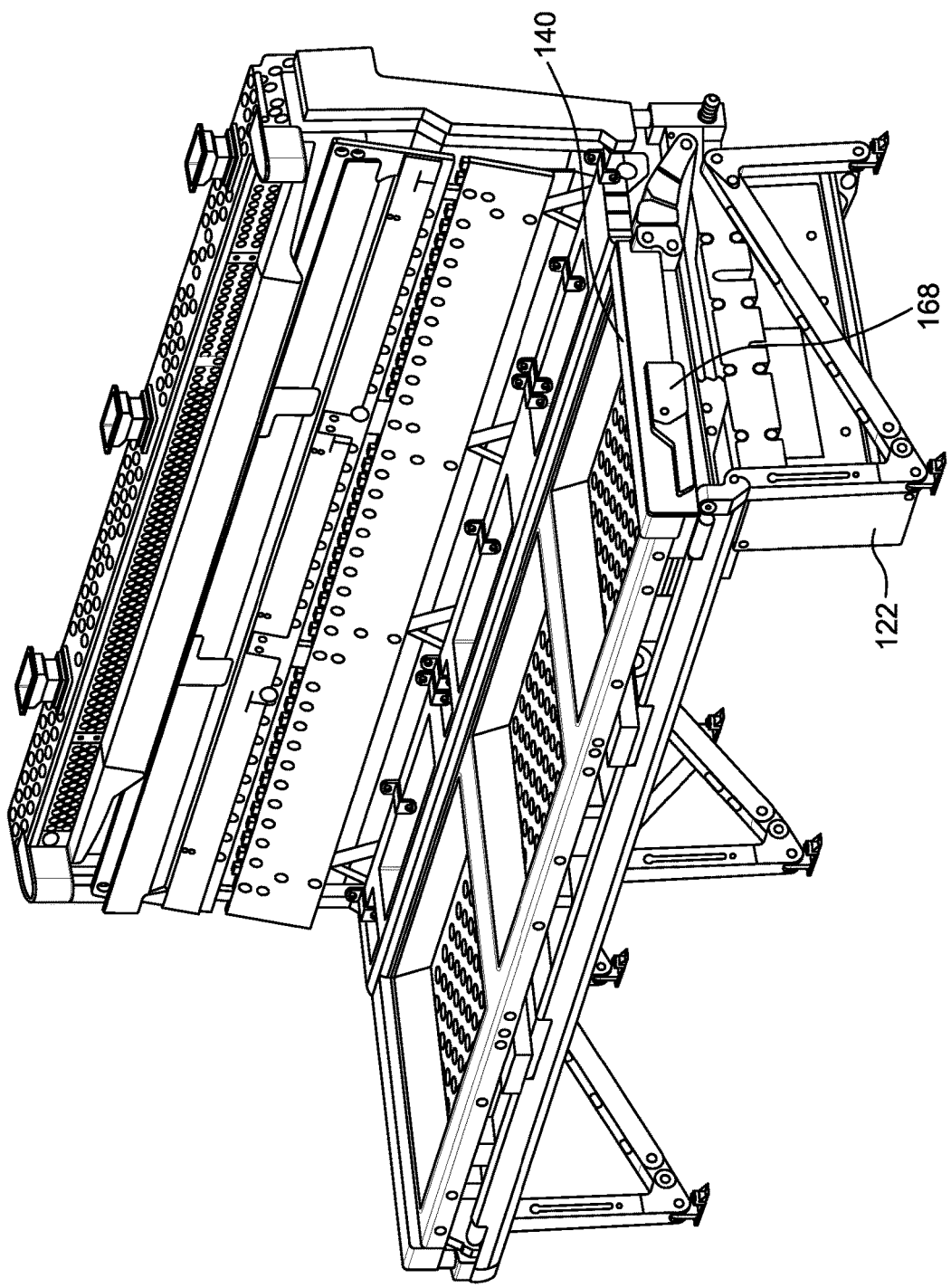
FIG. 9 is a perspective view of an aircraft divan frame showing a leg flail prevention device and outboard tracking handle.

FIG. 9 depicts the divan frame 108, and particularly an end-mounted tracking handle 168 and the leg flail prevention device 122. The tracking handle 168, discussed in detail below with reference to FIGS. 10 and 11, functions to unlock the tracking platform 140 from the divan frame 108 to return the divan to the upright sitting position. A tracking handle 168 can be provided at one or both ends of the divan frame 108 and is accessible from the aisle. For example, in a cabin configuration including installed opposing divans it may be necessary to release the tracking platforms from the aisle when the divans are in the berth position. The tracking handle 168 may function as the sole release for tracking the divan or may override a main tracking handle and/or electrical actuator.

The leg flail prevention device 122 is provided at a side-facing seat place to resist substantial g-force loading along the longitudinal axis of the aircraft in the event of an abrupt deceleration such as might result during hard braking or a forward-directed crash event. While the upper torso and thigh area of the legs are restrained to some extent by the shoulder harness, armrest, and end arm cabinet when present, the lower legs are free to move forward in the traveling direction, rotating violently around an axis defined by the knees, thereby potentially causing injury that could prevent egress and escape.

The leg flail prevention device 122 is mounted under the seat bottom frame 128 near the forward end of the divan in relation to the direction of forward travel of the aircraft. Exemplary leg flail prevention devices 122 include a housing adapted to be affixed to the frame and a deployable restraint panel configured to automatically deploy in the event of rapid or abrupt deceleration. The divan 100 may be equipped with a single leg flail prevention device 122 at the forward end or multiple devices, for example, one device near the forward end of each seat place. The restraint panel deploys from within the housing to a position forward of the divan and into the aisle. The device may include an actuator associated with the panel to automatically deploy the panel in response to a triggering event. Suitable actuators may include, but are not limited to, pushers, pistons, gas cylinders and rods, and the like for triggering instantaneous panel deployment. The device may further include a retractor for retracting the restraint panel immediately after the event to clear the aisle for unobstructed egress.

Figure 10:
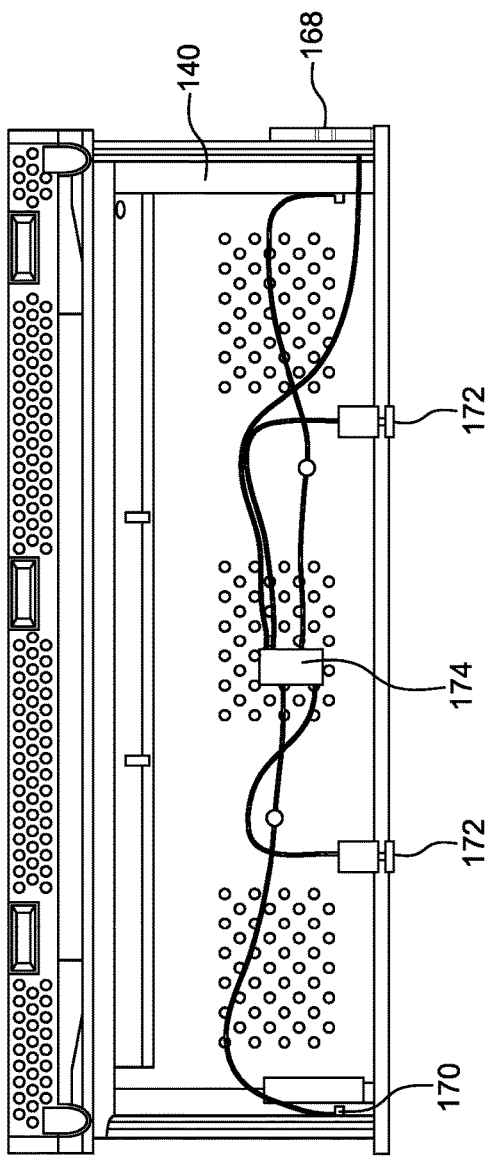
FIG. 10 is a top view through the aircraft divan frame showing a mechanical tacking handle configuration.

FIG. 10 depicts a mechanical tracking configuration of the divan. The tracking handle 168 is actuated to release one or more spring-loaded locking pins 170 to release the tracking platform from the seat bottom frame to track the seat bottom, for example, one or more spring-loaded pins carried on the tracking platform that unlock by withdrawing from a pin opening defined through a lateral frame member of the seat bottom frame. The tracking handle 168 may be coupled to the one or more spring-loaded locking pins 170 through cabling, wherein pulling on one end of the cabling releases the one or more locking pins 170. The mechanical tracking arrangement may include intermediate handles 172 located along the inboard side of the divan accessible between the first and second seats, and second and third seats. The tracking handle 168 and intermediate handles 172 are connected to a splitter 174 such that pulling on any one of the handles releases the one or more spring-loaded locking pins to release the tracking platform.

Figure 11:
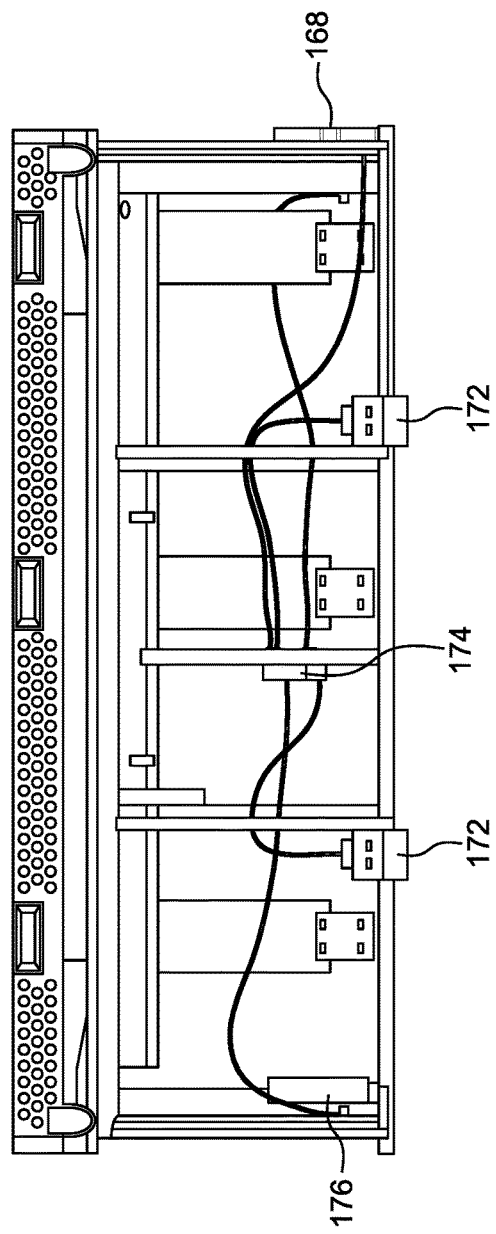
FIG. 11 is a top view through the aircraft divan frame showing a powered tracking handle configuration.

FIG. 11 depicts a powered tracking configuration of the divan. In the powered configuration, the tracking handle 168 is electrically coupled to one or more electric actuators 176 operable for releasing the tracking platform from the seat bottom frame. For example, the actuator may withdraw from an opening through the frame or otherwise decouple the tracking platform from the seat bottom frame. The powered arrangement also includes intermediate handles 172 for actuating the electrical actuator 176. The tracking handle 168 and intermediate handles 172 are connected to a splitter 174, such that actuating any one of the handles releases the tracking platform. The tracking handle 168 may function to override a main tracking handle and/or the intermediate handles and/or the electrical actuator to track the tracking platform in opposing divan installations.

Figure 12:
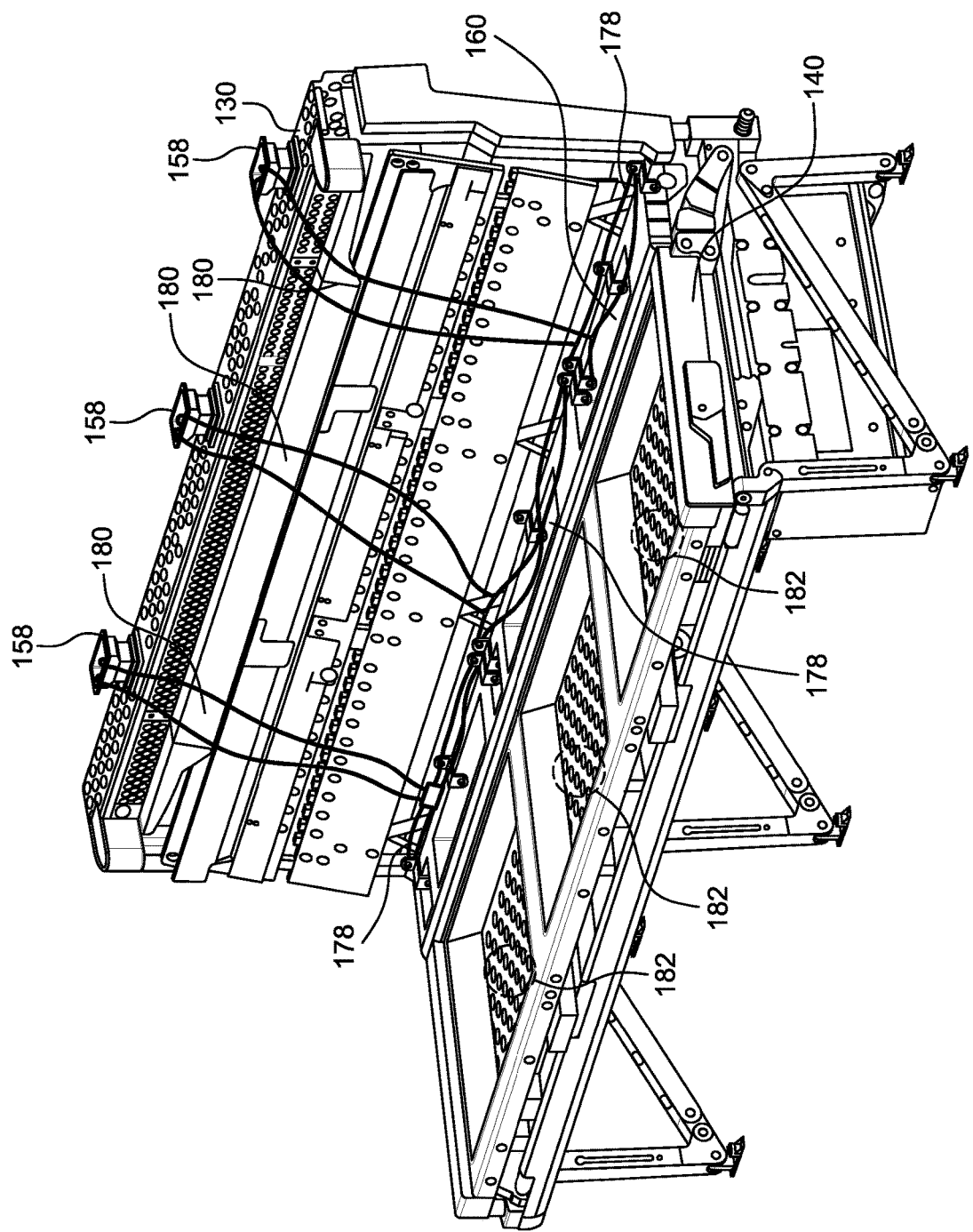
FIG. 12 is a perspective view of an aircraft divan frame showing lap belt attachment to the tracking platform.

FIG. 12 depicts the passenger restraint configuration of the divan. The lap belts 178 are anchored to the tracking platform 140 such that the lap belts track inboard with the tracking platform. As shown, the lap belts 178 are anchored to the outboard tube 160 of the tracking platform 140. Each seat place is preferably equipped with a lap belt and an inflatable shoulder harness 180, for example, as described in U.S. Pat. No. 8,746,735 incorporated by reference herein. The inflatable shoulder harness 180 is detachable from the lap belt 178 such that the lap belt can track inboard with the tracking platform. The shoulder harness 180 is retractable. A retractor 182 such as an inertia reel is provided at each seat place affixed below the seat bottom frame 128. One end of the inflatable shoulder harness is wound on the retractor 182, while a portion of the inflatable shoulder harness is routed outboard of the backrest frame through the belt guide and stows outside of the retractor such that the retractor provides unceasing tension on the inflatable shoulder harness. The inflatable shoulder harness 180 exits out the top of the backrest frame 130 through the exit bezel 158, and the free end of the inflatable shoulder harness is configured such that the buckle at the free end cannot withdraw into the exit bezel. A single mechanical crash sensor unit is provided to inflate the in-use inflatable shoulder harnesses and deploy the leg flail prevention device in response to a triggering event.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A three-place berthing aircraft divan, comprising:
   a fixed frame comprising a seat bottom frame and a backrest frame;
   first, second and third inboard legs affixed to the seat bottom frame;
   a seat bottom comprising a tracking platform supported by the seat bottom frame and movable relative thereto to track between an upright sitting position and a berth position;
   a backrest comprising a back follower supported by the backrest frame and movable relative thereto, the back follower and the tracking platform linked such that the back follower and the tracking platform track together between the upright sitting position and the berth position;
   a passenger restraint provided at each seat place, each passenger restraint including a lap belt anchored to the tracking platform and a should harness detachable from the lap belt; and
   an automatic leg flail prevention device disposed at one end of the seat bottom frame;
   wherein the tracking platform interlocks with the seat bottom frame and each of the lap belts are affixed to an outboard tube of the tracking platform such that each of the lap belts track inboard with the tracking platform and loading on each of the lap belts is transferred to the seat bottom frame through the tracking platform.

2. The aircraft divan of claim 1, wherein:
   the first leg and the third leg are disposed at opposing ends of the seat bottom frame;
   the second leg is disposed midway between the first leg and the third leg;
   the first leg and the second leg are spaced apart a predetermined distance such that a first container for containing a high-capacity life raft can be installed under the seat bottom frame between the first leg and the second leg; and
   the second leg and the third leg are spaced apart a predetermined distance such that a second container for containing a high-capacity life raft can be installed under the seat bottom frame between the second leg and the third leg.

3. The aircraft divan of claim 1, wherein:
   the seat bottom frame comprises lateral frame members at opposing ends thereof each comprising a first track and a second track along which respective first and second guides carried on the tracking platform are guided as the aircraft divan tracks between the upright sitting position and the berth position; and
   the backrest frame comprises lateral frame members at opposing ends thereof each comprising a single track along which guides carried on the back follower are guided as the aircraft divan tracks between the upright sitting position and the berth position.

4. The aircraft divan of claim 1, wherein:
   the tracking platform is aligned atop the seat bottom frame when the aircraft divan is in the upright sitting position and the tracking platform tracks inboard in a direction of an adjacent aisle and overhangs the aisle when the aircraft divan is in the berth position; and
   the back follower is aligned forward of the backrest frame when the aircraft divan is in the upright sitting position and is positioned atop the seat bottom frame when the aircraft divan is in the berth position.

5. The aircraft divan of claim 1, further comprising:
   a headrest position atop the backrest frame;
   cushions affixed to the backrest; and
   cushions affixed to the seat bottom.

6. The aircraft divan of claim 1, wherein the shoulder harness of each passenger restraint is an inflatable shoulder harness detachable from the lap belt, wherein one end of the inflatable shoulder harness is wound on a retractor disposed under the seat bottom frame, and wherein a portion of the inflatable shoulder harness is routed outboard of the backrest frame and stows outside of the retractor such that the retractor provides unceasing tension on the inflatable shoulder harness.

7. The aircraft divan of claim 1, further comprising a tracking handle disposed at one end of the seat bottom frame coupled to at least one locking pin preventing relative movement between the tracking platform and the seat bottom frame, the tracking handle actuated to disengage the at least one locking pin to allow the aircraft divan to track from the berth position to the upright sitting position.

8. The aircraft divan of claim 1, further comprising a mechanical crash sensor unit operably connected to the passenger restraints and the automatic leg flail prevention device, the mechanical crash sensor unit including a processor configured to sense a crash event, and in response to the sensed crash event, trigger inflation of a portion of each passenger restraint and deploy the automatic leg flail prevention device.

9. A three-place berthing aircraft divan adapted to be installed side-facing in an aircraft cabin, comprising:
a fixed frame comprising a seat bottom frame and a backrest frame affixed to the seat bottom frame;
a plurality of inboard legs affixed to the seat bottom frame;
a seat bottom supported by the seat bottom frame and comprising a tracking platform movable relative to the seat bottom frame to track between an upright sitting position and a berth position of the aircraft divan;
a backrest supported by the backrest frame and comprising a back follower movable relative to the backrest frame to track the aircraft divan between the upright sitting position and the berth position;
a passenger restraint provided at each seat place comprising a lap belt anchored to the tracking platform and an inflatable should harness detachable from the lap belt;
a leg flail prevention device disposed under one end of the seat bottom frame; and
a mechanical crash sensor unit including a processor configured to sense a crash event, and in response to the sensed crash event, trigger inflation of each inflatable should harness and deploy the leg flail prevention device;
wherein the tracking platform and the back follower are pivotably attached such that the seat bottom and the backrest track together relative to the frame between the upright sitting position and the berth position; and
wherein one end of each inflatable shoulder harness is wound on a retractor affixed under the seat bottom frame, wherein a length of the inflatable shoulder harness remains outside of the retractor such that the retractor provides unceasing tension on the inflatable shoulder harness.

10. The aircraft divan of claim 9, wherein the plurality of inboard legs includes a first leg, a second leg, and a third leg, wherein the first and second legs are adjacent and the second and third legs are adjacent and are spaced apart such that two containers for each containing a high-capacity life can be installed below the seat bottom frame between the plurality of inboard legs.

11. The aircraft divan of claim 10, wherein the aircraft divan has a length from about 200 cm to 205 cm, and wherein a distance between the first and second legs, and the second and third legs, is about 100 cm.

12. The aircraft divan of claim 9, wherein the seat bottom frame and the backrest frame each comprise elongate tracks for guiding tracking of the respective tracking platform and the back follower between the upright sitting position and the berth position, and each of the tracking platform and the back follower comprise vertically-oriented rollers that travel along respective ones of the elongate tracks.

13. The aircraft divan of claim 9, wherein the tracking platform locks to the seat bottom frame and the lap belts are affixed to an outboard tube of the tracking platform such that the lap belts track inboard with the tracking platform and loading on the lap belts is transferred to the seat bottom frame through the tracking platform.

14. The aircraft divan of claim 9, further comprising a tracking handle disposed at one end of the seat bottom frame coupled to at least one locking pin preventing relative movement between the tracking platform and the seat bottom frame, the tracking handle actuated to disengage the at least one locking pin to allow the aircraft divan to track from the berth position to the upright sitting position.

15. The aircraft divan of claim 9, further comprising:
a headrest positioned atop the backrest frame;
seat cushions affixed to the seat bottom frame; and
seat cushions affixed to the backrest frame.

* * * * *